US011736944B2

(12) United States Patent
Grayson et al.

(10) Patent No.: US 11,736,944 B2
(45) Date of Patent: *Aug. 22, 2023

(54) DYNAMIC POLICY-BASED ON-BOARDING OF DEVICES IN ENTERPRISE ENVIRONMENTS

(71) Applicant: Cisco Technology, Inc., San Jose, CA (US)

(72) Inventors: Mark Grayson, Maidenhead (GB); Desmond Joseph O'Connor, London (GB); Malcolm Muir Smith, Richardson, TX (US); Bart Brinckman, Nevele (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,527

(22) Filed: May 25, 2022

(65) Prior Publication Data
US 2022/0286856 A1  Sep. 8, 2022

Related U.S. Application Data

(63) Continuation of application No. 16/866,166, filed on May 4, 2020, now Pat. No. 11,350,279, which is a
(Continued)

(51) Int. Cl.
*H04W 12/08* (2021.01)
*H04L 9/40* (2022.01)
(Continued)

(52) U.S. Cl.
CPC ......... *H04W 12/08* (2013.01); *H04L 63/0876* (2013.01); *H04L 63/0892* (2013.01);
(Continued)

(58) Field of Classification Search
CPC ... H04W 12/08; H04W 12/06; H04W 12/084; H04L 63/0876; H04L 63/0892; H04L 63/102; H04L 63/20
See application file for complete search history.

(56) References Cited

U.S. PATENT DOCUMENTS

| 7,881,699 B2 | 2/2011 | Jones |
| 7,953,979 B2 | 5/2011 | Borneman et al. |

(Continued)

OTHER PUBLICATIONS

M. Milinovic et al., "eduroam Policy Service Definition", Version 2.8, GEANT, Jul. 26, 2012, 39 pages.
(Continued)

*Primary Examiner* — Christopher A Revak
(74) *Attorney, Agent, or Firm* — Baker Botts L.L.P.

(57) ABSTRACT

In one embodiment, a method for providing access to wireless networks may include receiving, by a wireless network access provider from a user device, a request to access a wireless network. The method may include obtaining data representing a policy applicable to the access request, sending the access request, augmented with the policy, to an identity provider associated with the user and having no pre-existing relationship with the access provider, and receiving, from the identity provider, an access request response indicating whether or not the policy is met. The method may include communicating, to the wireless device, an indication that the access request has been accepted, if the policy is met, or an indication that the access request has been rejected, if the policy is not met. The access provider and identity provider may be members of an identity and access federation that communicate over a dynamically established secure connection.

20 Claims, 6 Drawing Sheets

Related U.S. Application Data continuation of application No. 15/868,573, filed on Jan. 11, 2018, now Pat. No. 10,667,135.

(51) Int. Cl.
 *H04W 12/06* (2021.01)
 *H04W 12/084* (2021.01)

(52) U.S. Cl.
 CPC ............ *H04L 63/102* (2013.01); *H04L 63/20* (2013.01); *H04W 12/06* (2013.01); *H04W 12/084* (2021.01)

(56) References Cited

U.S. PATENT DOCUMENTS

| | | | |
|---|---|---|---|
| 8,769,626 B2 | 7/2014 | Gundavelli et al. | |
| 9,836,702 B2 | 12/2017 | Hinton | |
| 10,667,135 B2 * | 5/2020 | Grayson | H04W 12/084 |
| 11,350,279 B2 * | 5/2022 | Grayson | H04W 12/08 |
| 2007/0101145 A1 | 5/2007 | Sachdeva et al. | |
| 2007/0143829 A1 | 6/2007 | Hinton et al. | |
| 2008/0010665 A1 | 1/2008 | Hinton et al. | |
| 2011/0145895 A1 | 6/2011 | Zhang et al. | |
| 2011/0179475 A1 | 7/2011 | Foell et al. | |
| 2012/0311663 A1 | 12/2012 | Seidl et al. | |
| 2014/0153555 A1 | 6/2014 | Gupta | |
| 2017/0230905 A1 | 8/2017 | Pularikkal et al. | |
| 2017/0339176 A1 | 11/2017 | Backer et al. | |
| 2017/0359332 A1 | 12/2017 | Hanay et al. | |
| 2018/0192359 A1 * | 7/2018 | Wang | H04L 67/30 |
| 2018/0367310 A1 | 12/2018 | Leong et al. | |
| 2020/0021596 A1 | 1/2020 | Jiang | |
| 2022/0210197 A1 * | 6/2022 | Vaner | H04L 63/10 |

OTHER PUBLICATIONS

F. Adrangi et al., "Chargeable User Identity", Standards Track RFC 4372, Jan. 2006, 8 pages.

* cited by examiner

DYNAMIC POLICY-BASED ON-BOARDING OF DEVICES IN ENTERPRISE ENVIRONMENTS

PRIORITY

This application is a continuation, under 35 U.S.C. § 120, of U.S. patent application Ser. No. 16/866,166 filed on May 4, 2020; which is a continuation, under 35 U.S.C. § 120, of U.S. patent application Ser. No. 15/868,573 filed on Jan. 11, 2018, now U.S. Pat. No. 10,667,135 and entitled "Dynamic Policy-Based On-Boarding of Devices in Enterprise Environments"; each of which is hereby incorporated by reference in its entirety.

TECHNICAL FIELD

The present disclosure relates generally to providing access to wireless networks.

BACKGROUND

When entering an enterprise facility that provides access to a wireless network to employees (or members) and non-employees (or non-members), a visitor to the facility typically signs in at a reception area and is given a password for the wireless network. If the visitor wishes to connect to the wireless network through a user device, the visitor can then enter the password through an enterprise-specific web portal and respond to prompts indicating that the visitor agrees to specific terms and conditions imposed by the enterprise. If the visitor does not wish to connect to the wireless device, or does not agree to the specific terms and conditions imposed by the enterprise, the visitor might disable the wireless network interface on their user device.

DESCRIPTION OF EXAMPLE EMBODIMENTS

Overview

According to one embodiment, a method for providing access to wireless networks may include receiving, by a wireless network access provider from a user device, a request to access a wireless network. The method may include obtaining data representing a policy applicable to the access request, sending the access request, augmented with the policy, to an identity provider associated with the user and having no pre-existing relationship with the access provider, and receiving, from the identity provider, an access request response indicating whether or not the policy is met. The method may include communicating, to the wireless device, an indication that the access request has been accepted, if the policy is met, or an indication that the access request has been rejected, if the policy is not met. The access provider and identity provider may be members of an identity and access federation that communicate over a dynamically established secure connection.

Example Embodiments

Figure 1:
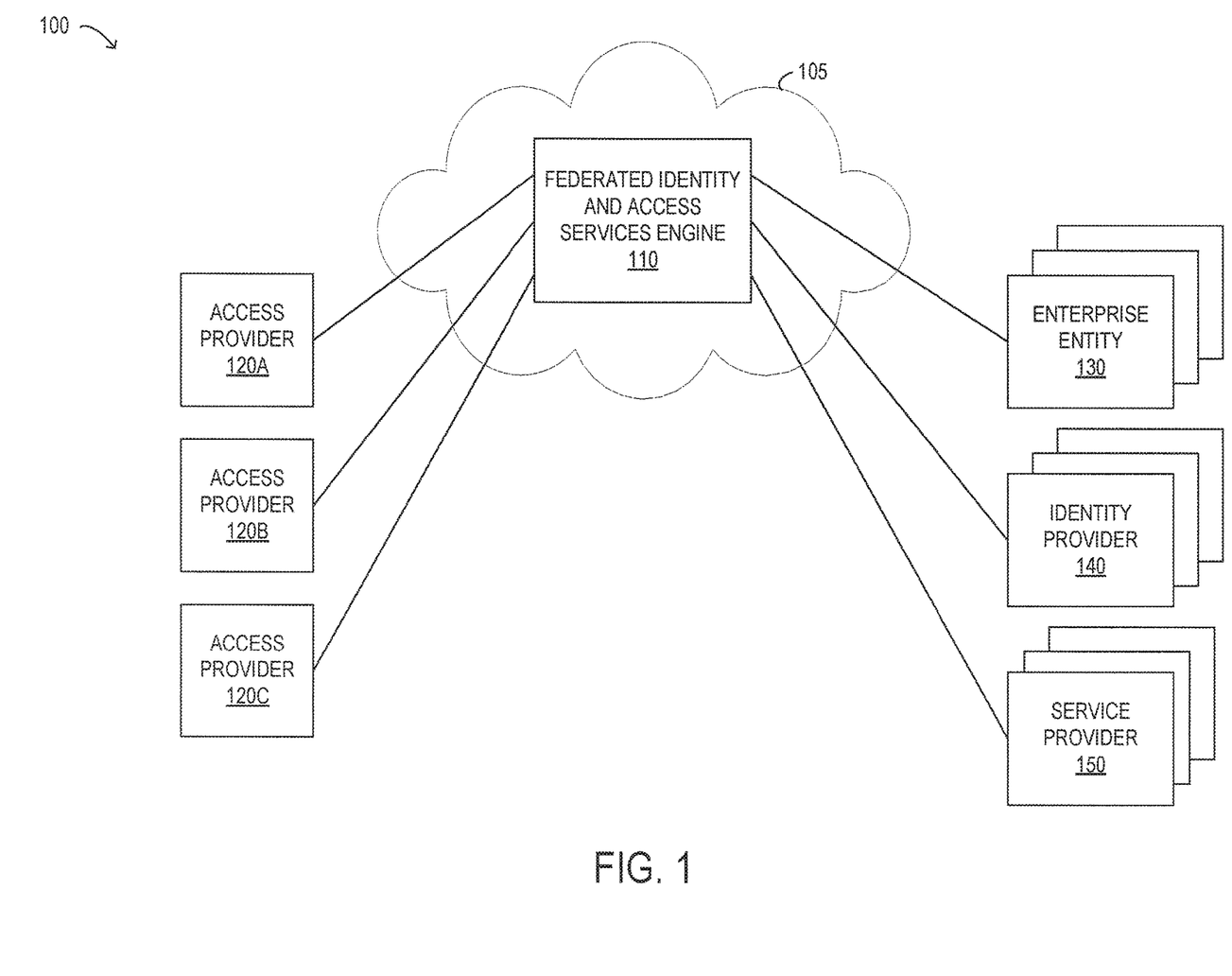
FIG. 1 illustrates a wireless roaming environment including a federated identity and access services engine of an identity and access federation.

FIG. 1 illustrates a wireless roaming environment 100 including a federated identity and access services engine 110 of a cloud-based identity and access federation though which members or participants define a collection of common terms, conditions, and terms of service for identity and access policies. In the illustrated example, federated identity and access services engine 110 is configured to implement a cloud-based service for automating negotiations between identity providers and access policies including, but not limited to, negotiating terms and conditions, acceptable use policies, liability disclaimers, and provisions for providing permanent identities of guest users of a wireless network and/or their devices. In the illustrated embodiment, federated identity and access services engine 110 operates on a network 105 in the cloud. In certain embodiments, federated identity and access services engine 110 may implement an Authentication, Authorization, and Accounting (AAA) framework to facilitate access network provider and identity provider on-boarding, including acting as a certificate authority on behalf of the identity and access federation. In certain embodiments, federated identity and access services engine 110 may also be configured to provide, or coordinate, capabilities for logging data related to operations performed, services received, or resource usage and making that data visible for accounting purposes.

In certain embodiments, in order to take advantage of the automated negotiations facilitated by identity and access services engine 110, access providers 120 and identity providers 140 may join or participate in the identity and access federation. In certain embodiments, the federation may allow for flexibility regarding the terms and conditions that each access provider 120 and identity provider 140 adheres to and/or enforces. For example, the specific subsets of the defined terms and conditions for which individual access providers 120 and identity providers 140 require consent may vary between providers. In certain embodiments, there may be different tiers of policies from an access and/or an identity perspective to which users must agree in order to connect with a visited wireless network. In certain embodiments, some policies enforced on an identity provider basis may define requirements of an access provider or service rather than being enforced through user consent. In certain embodiments, the federation may serve as a trust anchor for the access providers 120 and identity providers 140 in wireless roaming environment 100.

In certain embodiments, identity and access services engine 110 may be configured to on-board various access providers 120 and identity providers 140 through a validation process. For example, if an access provider 120 elects to join the identity and access federation and is validated by identity and access services engine 110, it becomes of member of the federation and is trusted by identity providers 140 that are also members of the federation. Similarly, if an identity provider 140 elects to join the identity and access federation and is validated by identity and access services engine 110, it becomes of member of the federation that is trusted by access providers 120 that are also members of the federation. As described in more detail below, validating an access provider or an identity provider may include confirming that the access provider or identity provider is actually the entity it purports to be. Once an access provider or identity provider is validated by identity and access services engine 110, identity and access services engine 110 may distribute certificates to the access provider or identity provider indicating that it is a trusted member of the identity and access federation. Subsequent to this certification, secure communication channels may be established between access providers 120 and identity providers 140 that are members of the identity and access federation, after which they may communicate with each other over these secure channels. In other words, in certain embodiments, access providers 120 and identity providers 140 that are trusted by identity and access services engine 110, as evidenced by the certificates they have been issued by identity and access services engine 110, may automatically establish a trust relationship with each other based on their trust relationships with identity and access services engine 110.

As illustrated in FIG. 1, within wireless roaming environment 100, federated identity and access services engine 110 may be communicatively coupled to one or more enterprise entities 130, identity providers 140, and/or service providers 150 over network 105 during the certification process through which the enterprise entities 130, identity providers 140, and/or service providers 150 join the identity and access federation. Federated identity and access services engine 110 may also be communicatively coupled to multiple access providers 120 during the certification process through which the access providers 120 join the identity and access federation. In certain embodiments, each access provider 120 may implement a wireless access point, or wireless "hotspot," for an enterprise entity 130 or service provider 150. In certain embodiments, an access provider 120 may include a Wireless Local Area Network (LAN) Controller, or WLC, for a public wireless network. Other suitable technologies may be used to control access to a visited wireless network, in other embodiments. For example, in some embodiments, LTE based wireless access technologies are used by the access provider 120. In such embodiments, the access provider 120 may include LTE eNB, Mobility Management Entity (MME) and Serving Gateway (SGW) functions for a public LTE wireless network. In some embodiments, wireless access provider 120 may be configured to operate in a specific spectrum, for example lightly licensed Citizen's Broadband Radio Service (CBRS) or Multefire Alliance defined unlicensed 5 GHz spectrum.

In various embodiments, access providers 120 may operate in shopping centers, retail shops, hotels, airports, train stations, restaurants, coffee shops, schools, public libraries, recreational areas, amusement parks, concert or sporting venues, or in other types of businesses or enterprises that allow customers or guests to connect to their wireless networks if they agree to certain conditions.

In various embodiments, identity providers 140 may include "home" service providers, such as Internet service providers or cellular data service providers that have an existing relationship with a user or a user device thereof. In certain embodiments, an identity provider 140 may be an authentication service with which a user or a user device has an existing relationship. In certain embodiments, a social media application or service to which a user is a subscriber may maintain one or more identities associated with the subscriber as well as credentials for those identities, and thus may act as an identity provider 140 in wireless roaming environment 100. In certain embodiments, a user profile, including such credentials, may be stored in a memory on a user device for use when connecting to a wireless network.

In certain embodiments, in order for identity and access services engine 110 to validate an identity provider 140, the engine may be configured to identify the identity provider by their AAA address. The AAA address will be Domain Name System (DNS) resolved and, thus, will be associated with a domain name. In addition, the identity provider may be associated with a realm name that maps the identity provider to its owner. In certain embodiments, identity and access services engine 110 may be configured to validate the identity provider by verifying the ownership of the domain name and realm name that are associated with the identity provider through the DNS. If and when the identity provider 140 is validated, identity and access services engine 110 may issue security credentials (e.g., a certificate) to the identity provider indicating its membership in the identity and access federation. In certain embodiments, the identity and access federation must include at least one identity provider before it can on-board an access provider.

In certain embodiments, in order for identity and access services engine 110 to validate an access provider 120, the engine may be configured to confirm that the access provider is associated with an actual human person, e.g., a person who is responsible for that access provider and who can be contacted in case problems are encountered with respect to the access provider. In certain embodiments, the validation may include determining that there is a valid mobile phone number associated with the access provider, e.g., one that can be traced back to a particular human person. In other embodiments, other methods may be used to by identity and access services engine 110 to validate an access provider 120. If and when the access provider 120 is validated, identity and access services engine 110 may issue security credentials (e.g., a certificate) to the access provider indicating its membership in the identity and access federation.

Figure 2:
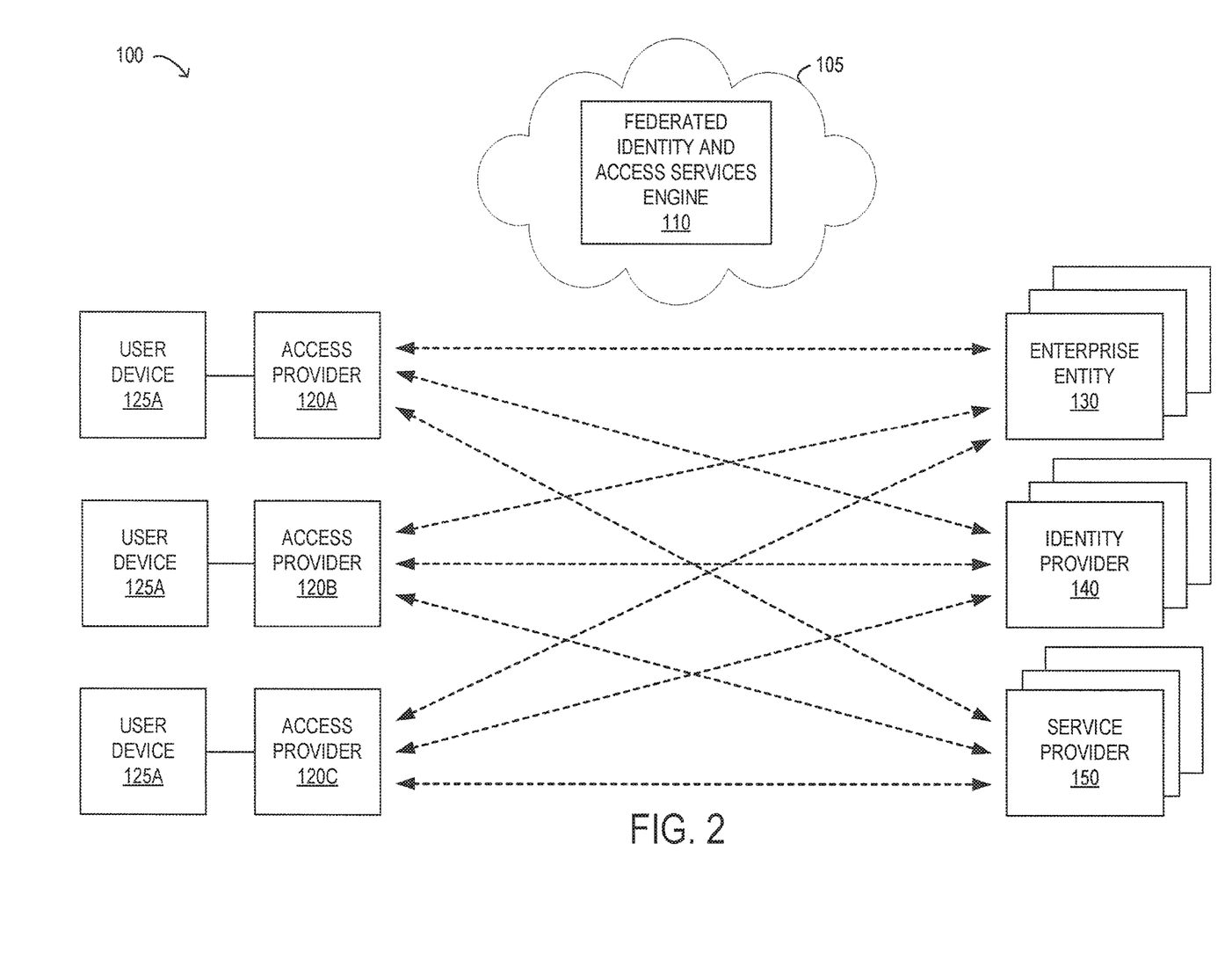
FIG. 2 illustrates dynamic connections between access providers, enterprise entities, identity providers, and service providers in the wireless roaming environment illustrated in FIG. 1.

FIG. 2 illustrates dynamic connections between access providers, enterprise entities, identity providers, and service providers in the wireless roaming environment illustrated in FIG. 1. More specifically, FIG. 2 illustrates connections between access providers, enterprise entities, identity providers, and service providers following the certification, by federated identity and access services engine 110, of multiple access providers 120 and identity providers 140 in roaming environment 100 as members of an identity and access federation. Following this certification, secure connections (shown as dashed arrows) have been established between various pairs of these entities within wireless roaming environment 100. In certain embodiments, the illustrated components may communicate directly with each other over the secure connections (rather than communicating with each other through federated identity and access services engine 110) to perform AAA negotiations, as described herein. For example, in certain embodiments, the illustrated components may exchange messages in accordance with the Remote Authentication Dial-In User Service (RADIUS) networking protocol over a Transport Layer Security (TLS) protocol. Other suitable authentication protocols may be used in other embodiments.

In the embodiment illustrated in FIG. 2, each of user devices 125 may be communicatively coupled to a respective access provider 120 through which the user device 125 may be able to obtain access to respective service providers 150, some of which may be operated by one of enterprise entities 130. In certain embodiments, more than one user device 125 may be coupled to a given access provider 120 at a time. In certain embodiments, user devices 125 may include mobile communication devices, such as smart phones or tablet computing devices. User devices 125 may also include Internet-of-Things (IoT) devices that do not have the ability to display web pages or agree to specific terms and conditions.

As described herein, following certification by federated identity and access services engine 110, the access providers 120 and identity providers 140 may dynamically and automatically negotiate between themselves, even when there is no previously established relationship between particular pairs of access providers 120 and identity providers 140, in order to authenticate users and/or their user devices 125. This may allow a user device 125 to access a particular enterprise entity 130 or service provider 150 operating on a visited wireless network and/or allow a guest user to use mobile data applications on their user device 125 over the visited wireless network. For example, in certain embodiments, once a user device 125 of a guest user locates an access provider 120 that is a member of the identity and access federation, the access provider 120 may automatically facilitate a negotiation with an identity provider 140 associated with the guest user and/or a user device 125 thereof. This may include augmenting the signaling that would otherwise pass between the access provider 120, which may enforce a set of identity and/or access policies, and the identity provider 140, which may enforce a set of identity and/or access policies as well, to include indications of those policies (e.g., identifiers of the policies, or data defining the policies) and/or whether or not they have been agreed to or otherwise met. In certain embodiments, the negotiation may include verifying that the access provider 120 and an identity provider 140 belong to the federation. In certain embodiments, the verification (authentication) may be performed in accordance with a public key infrastructure (PKI). In certain embodiments, the verification (authentication) may be performed by exchanging messages in accordance with the RADIUS networking protocol over a TLS protocol. Other suitable authentication protocols may be used in other embodiments.

In certain embodiments, the negotiation between the access provider 120 and an identity provider 140 may be based on any of a variety of identity and access policies obtained from a repository of such policies, some of which may be specific to the visited wireless network, the device type of user device 125, the guest user, the identity provider 140, a target service provider 150, or a target enterprise entity 130. If the negotiation is successful, the guest user may be granted access to a visited wireless network in wireless roaming environment 100 that is associated with the access provider 120. In certain embodiments, assuming federated identity and access services engine 110 has previously delivered the necessary security credentials to the access provider 120 and the identity provider 140, a secure connection may be dynamically established between the access provider 120 and the identity provider 140. Subsequently, there may be a signaling from the access provider 120 indicating specific policies to be met (which may include some policies to which the guest user is required to consent) in order to be allowed to connect to the wireless network, and a signaling back from the identity provider 140 indicating whether those policies have been met. In certain embodiments, the exchanged messages may be messages in accordance with the Extensible Authentication Protocol (EAP) framework.

In certain embodiments, identity provider 140 may compare applicable identity and/or access policies to the policies to which the guest user has consented or are otherwise met. In certain embodiments, particular per-subscriber policies that are applicable to a given wireless network connection request may be based on a set of credentials associated with the guest user or a user device 125 thereof. For example, a given set of credentials (and a corresponding identity) for a guest user or user device 125 may be associated with a respective identity provider, which may store per-subscriber policy data associated with that identity. The per-subscriber policies supported by different identity providers with which a guest user or a user device 125 thereof is associated may be the same or may be different, in different embodiments. Similarly, different classes of access providers may be associated with different identity and access policies. In certain embodiments, access providers 120 and identity providers 140 may be configured to mix and match these policies within the signaling exchanged between them to ensure that as users are authenticated onto various wireless networks in the wireless roaming environment they are suitably authorized.

In certain embodiments, an identity provider 140 (or an AAA framework thereof) may be configured to recover information signaled by access provider 120. In certain embodiments, an identity provider 140 (or an AAA framework thereof) may be configured to complete an EAP dialogue initiated on behalf of a guest user or a user device 125 thereof. In certain embodiments, an identity provider 140 (or an AAA framework thereof) may be configured to use an authenticated identity of a guest user or a user device 125 thereof to look up, in a policy database, the policies agreed to by the guest user or user device 125. In certain embodiments, an identity provider 140 may be configured to cause the authentication exchange with the access provider 120 to fail if the user has not agreed to those policies, in which case an indication of the failure is signaled to the access provider 120. In certain embodiments, an identity provider 140 may be configured to signal any information required by the applicable policies, such as, for example, a permanent identity, to access provider 120.

Figure 4:
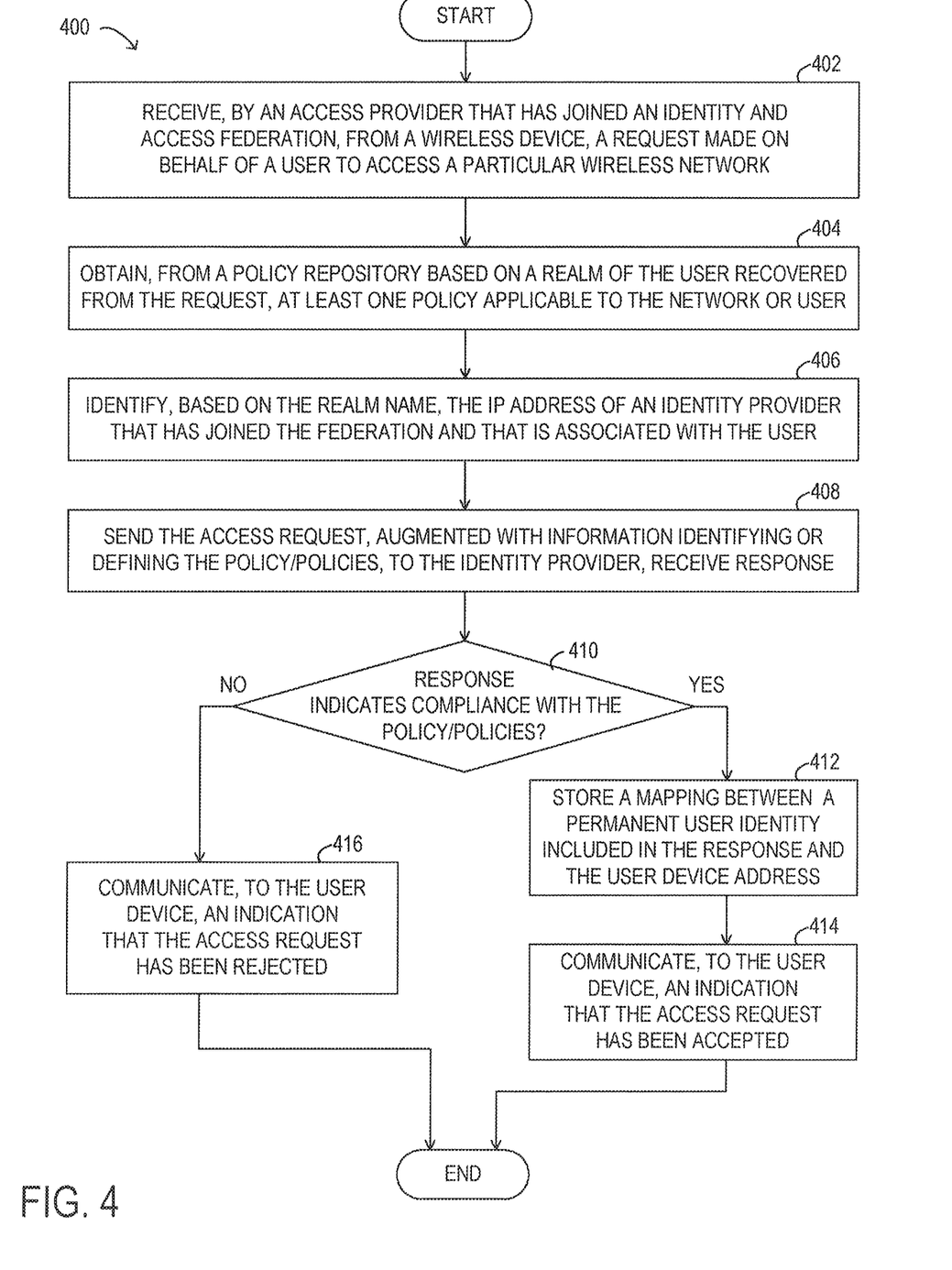
FIG. 4 is a flow diagram illustrating an example method for requesting, by an access provider on behalf of a potential guest user, access to a wireless network and receiving a response.
Figure 5:
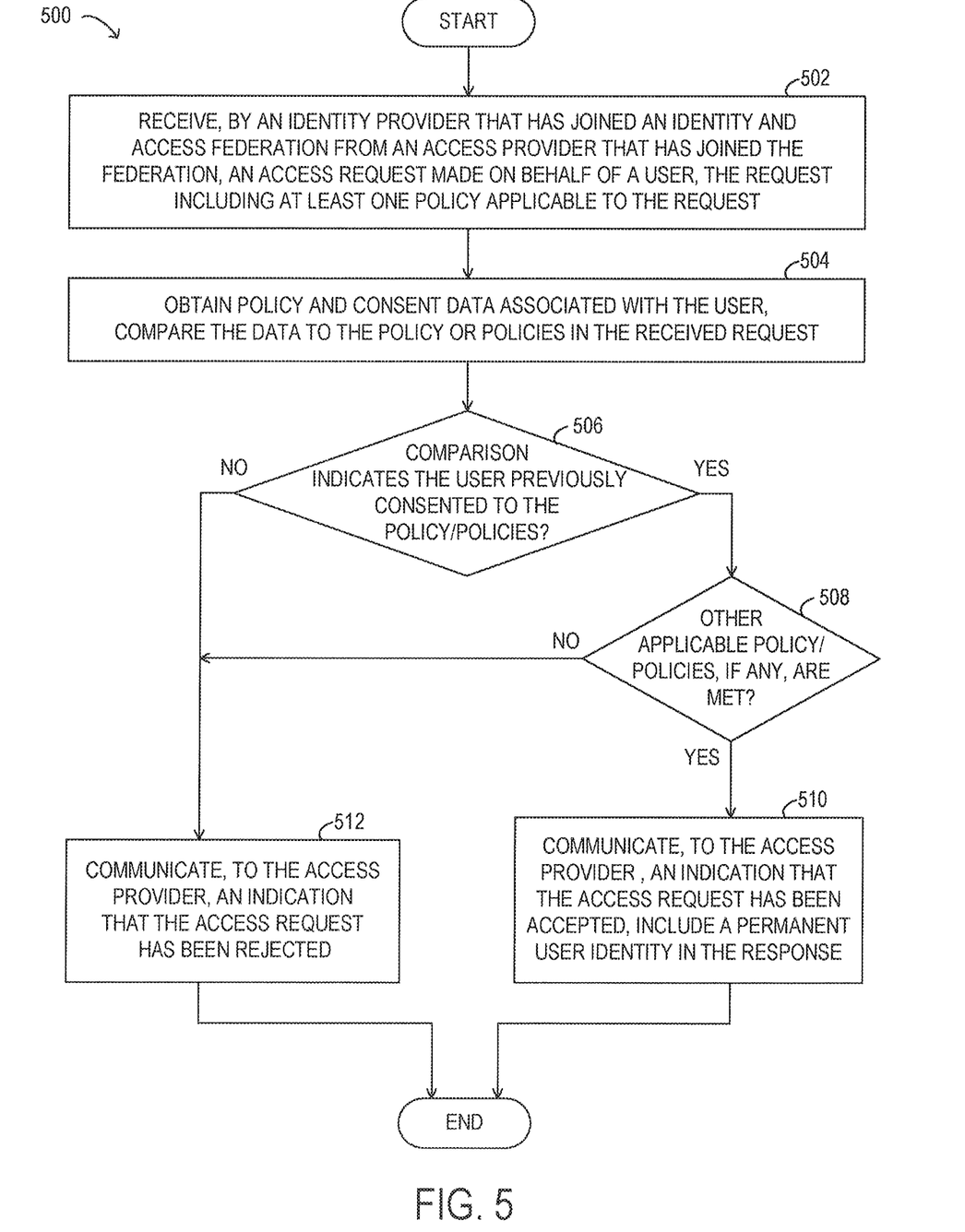
FIG. 5 is a flow diagram illustrating an example method for authenticating, by an identity provider, a request to access a wireless network, including determining compliance with applicable identity and/or access policies.

In certain embodiments, access provider 120 may be configured to recover information signaled by an identity provider 140 (or an AAA framework thereof) and use the information for its own policy purposes. In certain embodiments, access provider 120 may include, be coupled to, or be in communication with a policy repository in which various identity and/or access policies are matched with respective unique identifiers of user devices 125. For example, the policy repository may store mappings between identity and/or access policies and respective media access control (MAC) address ranges. In certain embodiments, access provider 120 may be configured to signal any necessary enterprise policies to an identity provider 140. An AAA system in the access provider 120 may be configured to recover the policy information received from the identity provider 140 and to dynamically adapt its behavior accordingly. Various operations of identity and access services engine 110, identity providers 140, and access providers 120 within wireless roaming environment 100 may be further illustrated by way of the flow diagrams depicted in FIGS. 3-5 and described below. For example, FIGS. 4 and 5 illustrate example methods that, collectively, implement automatic on-boarding of user devices in an enterprise environment.

In certain embodiments, the systems and methods described herein for automatically on-boarding devices in enterprise environments may support the use of organizational unique identifiers (OUIs) in determining which access and/or identity policies are applicable to a given wireless network access request. The GUIs may include the portion of a Media Access Control (MAC) address that identifies the vendor of a network adapter. In certain embodiments, the systems and methods described herein for automatically on-boarding devices in enterprise environments may support the use of Fully Qualified Domain Names (FQDNs) in determining which access and/or identity policies are applicable to a given wireless network access request. An FQDN may specify the exact location of a webpage or other network resource. In certain embodiments, an FQDN may be resolved to address information associated with access providers and identity providers as a result of their on-boarding, including terms and conditions/acceptable use policies and/or certificates distributed by identity and access services engine 110. In certain embodiments, an FQDN may be resolved to address reporting, logging, and/or troubleshooting of a service to which a guest user is granted access. In certain embodiments, an FQDN may be used for public key infrastructure (PKI) in a wireless roaming environment, e.g., as a certificate authority (CA). In such embodiments, the certificate may embed information related to an FQDN for online certificate status checking, an FQDN for CA Issuers, and/or an FQDN for one or more Certificate Policies.

In certain embodiments, the systems and methods described herein for automatically on-boarding devices in enterprise environments may enable seamless on-boarding while meeting enterprise IT security and policy requirements. For example, in certain embodiments, enterprise environments may be obligated to track usage by guest users and/or to associate the traffic to and from a device used by an enterprise employee (e.g., a meeting organizer), and the systems and methods described herein may support those obligations. In certain embodiments, the systems described herein may support the use of a kiosk (e.g., in a reception area of an enterprise facility) at which a potential guest user (e.g., a meeting organizer or attendee) can enter their telephone number (e.g., an MSISDN) and contact information for themselves and/or for other participants in the meeting. The kiosk may be communicatively coupled to an access provider within a wireless roaming environment that is a member of an identity and access federation. The access provider may facilitate the authentication of the potential guest user and/or other meeting participants in a manner similar to that described above for authenticating a single potential guest user. For example, because a permanent identity (MSISDN) has been provided for the potential guest user, this information may be included in, or appended to, an access accept message for the meeting organizer or participant who entered it through the kiosk. In addition, since the meeting organizer or participant has also indicated, through the kiosk, who they are meeting and their contact information, this information may be linked from the web interaction between the potential guest user and the kiosk to the access provider to seamlessly integrate this information into an AAA negotiation between the access provider and various identity providers associated with respective ones of the other meeting participants to authorize access by the other meeting participants.

Figure 3:
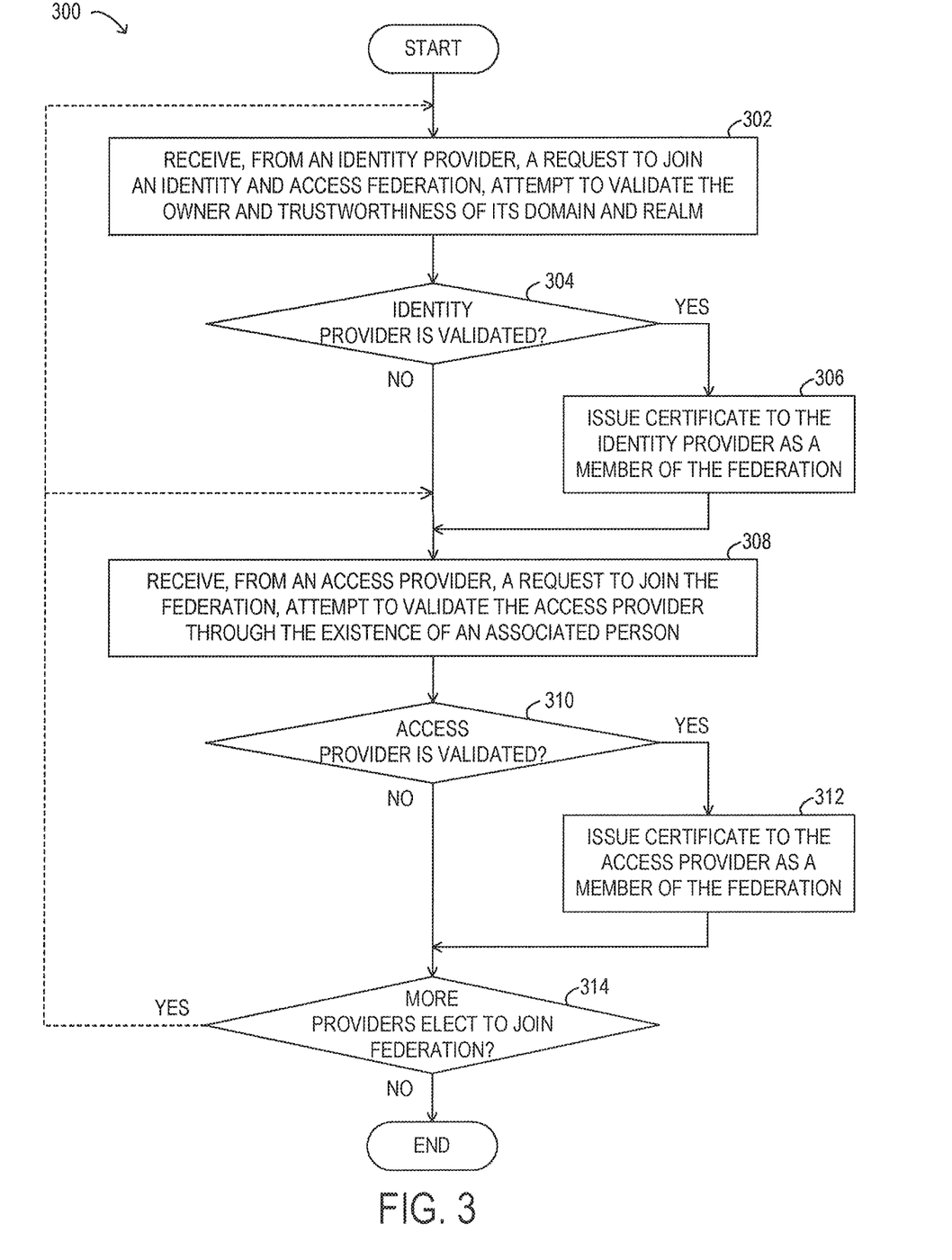
FIG. 3 is a flow diagram illustrating an example method for automatically on-boarding identity providers and access providers to an identity and access federation within a wireless roaming environment.

FIG. 3 is a flow diagram illustrating an example method for automatically on-boarding identity providers and access providers to an identity and access federation within a wireless roaming environment. In some embodiments, method 300 may be performed by a federated identity and access services engine within a wireless roaming environment, such as engine 110 illustrated in FIG. 1 and FIG. 2. Method 300 may begin and, at 302, may include receiving, from an identity provider, a request to join an identity and access federation and attempting to validate the identity provider. In certain embodiments, validating the identity provider may include validating the owner of the identity provider and the trustworthiness of the domain and realm of the identity provider, as described above. In other embodiments, other methods may be used to validate the identity provider.

If, at 304, the identity provider is validated, method 300 may proceed to 306. Otherwise, method 300 may proceed to 308. At 306, the method may include issuing a certificate to the identity provider as a member of the identity and access federation.

At 308, the method may include receiving, from an access provider, a request to join the federation and attempting to validate the access provider. In certain embodiments, validating the access provider may include verifying the existence of an actual human person that is associated with the access provider, as described above. In other embodiments, other methods may be used to validate the access provider.

If, at 310, the access provider is validated, method 300 may proceed to 312. Otherwise, method 300 may proceed to 314. At 312, the method may include issuing a certificate to the access provider as a member of the identity and access federation. Once at least one identity provider and one access provider have been on-boarded to the federation, the identity providers and access providers may be able to communicate with each other directly over dynamically established secure links to negotiate and provide access to particular wireless networks by users who have relationships with particular identity providers.

As shown by the dashed lines illustrated in FIG. 3, if, at 314, there are more identity providers and/or access providers who elect to join the federation, any or all of the operations of method 300 may be repeated, as appropriate. For example, if there are additional identity providers who elect to join the federation, the operations shown as 302-306 may be repeated for each additional identity provider to potentially on-board the identity provider to the federation within the wireless roaming environment. In another example, if there are additional access providers who elect to join the federation, the operations shown as 308-312 may be repeated for each additional access provider to potentially on-board the access provider to the federation within the wireless roaming environment. In various embodiments, any number of identity providers and access providers may join the federation, after which they can communicate with each other directly over dynamically established secure connections in any access provider/identity provider pairing. However, identity providers and access providers need not join the federation in pairs.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for automatically on-boarding identity providers and access providers including the particular steps of the method of FIG. 3, this disclosure contemplates any suitable method for automatically on-boarding identity providers and access providers including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIG. 4 is a flow diagram illustrating an example method for requesting, by an access provider on behalf of a potential guest user, access to a wireless network and receiving a response. In some embodiments, method 400 may be performed by an access provider that has joined an identity and access federation, such as any of access providers 120 illustrated in FIG. 1 or FIG. 2. Method 400 may begin and, at 402, may include receiving, by an access provider that has joined an identity and access federation, from a wireless device, a request made on behalf of a user to access a particular wireless network. In certain embodiments, the user may have no previous or current relationship with the access provider. For example, the request may be a request to connect to a wireless network operated by an enterprise that is made on behalf of a customer or guest of the enterprise.

Method 400 may include, at 404, obtaining from a policy repository based on a realm of the user recovered from the request, at least one policy applicable to the network and/or the potential guest user. For example, a realm name associated with the user may be recovered from the received request and may be used to look up the applicable policy or policies in the policy repository. The policy repository may store a variety of identity and access policies, some of which may be specific to the wireless network to be visited, the device type of a user device through which the potential guest user wishes to access the wireless network, the guest user, an identity provider with which the potential guest user has a relationship, a target service provider, or a target enterprise entity. In certain embodiments, the policies may include a requirement to provide permanent user identity for the potential guest user. For example, it may be a policy of the access provider to only permit users to connect to the wireless network if a permanent identity of the potential guest user is known. In certain embodiments, the policy may include an indication that the enterprise domain will only permit access to the wireless network if the identity provider appends a permanent user identity to the access accept message that is returned by the identity provider at the conclusion of the authentication dialogue. The policy may indicate one or more types of permanent identities that are acceptable. For example, in certain embodiments, the permanent identity of a potential guest user may include a telephone number (e.g., a mobile phone number). In certain embodiments, the policies applicable to a given access request may include identity provider policies instead of, or in addition to, user-consented policies. For example, an identity provider may enforce a policy that only permits authentication if the access provider indicates their network supports VoIP, or meets some other certification/compliance level.

In certain embodiments, the policies may indicate that the access request is associated with an enterprise domain having specific policy requirements. In certain embodiments, the policies may indicate an acceptable use policy to which the potential guest user is required to have consented. In certain embodiments, the policies may include a pointer to a list of public acceptable use policies to which the potential guest user is required to have consented. In certain embodiments, the policies may indicate an implied disclaimed liability for the enterprise provider. In certain embodiments, the policies may include a pointer to a list of public disclaimers to which the potential guest user is required to have agreed. In certain embodiments, members or participants in the federation, including various access providers and/or identity providers, may have agreed to a defined collection of common terms, conditions, and terms of service for identity and access policies. An individual access provider may specify that, in order to be allowed to connect to a given wireless network, a potential guest user is required to have consented to the terms and conditions on an access-provider-specific list of terms and conditions, e.g., terms 1, 4, 3, 4, 6, 8, and 10 in the defined collection of terms and conditions. If the potential guest user has not consented to these terms, they will not be allowed to connect to the wireless network.

In certain embodiments, some terms and conditions may be required of all potential guest users who wish to access a particular wireless network. For example, all potential guest users may be required to agree to terms related to security, fraud, and/or illegal behavior. In certain embodiments, potential guest users may be required to adhere to age-related restrictions on access to particular wireless networks or to consent to age-related content filtering, e.g., for potential guest users under the age of thirteen. In general, any suitable combination of policies may be applied to different wireless network access requests made on behalf of a potential guest user.

At 406, method 400 may include identifying, based on the realm name, the IP address of an identity provider that has joined the federation and that is associated with the user. In certain embodiments, the access provider may not yet know the identity of the potential guest user, but may know the MAC address associated with a user device through which the potential guest user wishes to connect to the visited wireless network. For example, the MAC address of the user device may be included in, and extracted from, the access request received from the access provider on behalf of the user. In certain embodiments, the access provider may be able to discern the device type of the user device based on the MAC address, may be able to identify certain identity and/or access policies that are applicable to devices of the identified type, and may subsequently provide information about the applicable policy or policies to an identity provider associated with the potential guest user's device. For example, in certain embodiments, messages that are exchanged during performance of the method illustrated in FIG. 4 may constitute an EAP dialogue in which some of the messages have been augmented with additional policy-related information by the access provider.

Method 400 may include, at 408, sending the access request, augmented with information identifying or defining the applicable access policy or policies, to the identity provider associated with the user, and receiving a response. In certain embodiments, the access provider may augment a RADIUS access request, which includes a user name attribute having a pseudonym, with additional attributes and signal the augmented message to the identity provider. For example, the message may be augmented with an indication that the visited wireless network is an enterprise network that has particular policy requirements. In another example, the message may be augmented with an indication that the visited wireless network has a requirement that particular liability disclaimers have been accepted, or that a particular end user acceptable use policy has been accepted. In yet another example, the message may be augmented with an indication that the visited wireless network has a requirement that a permanent identity of the potential guest user must be communicated to the access provider in order to connect to the wireless network.

If, at 410, the response received from the identity provider indicates that the request complies with the required policy or policies, method 400 may proceed to 412. Otherwise, method 400 may proceed to 410. As noted above, the required policies may include policies to which the user previously consented and/or identity provider policies. For example, an identity provider may enforce a policy that only permits authentication if the access provider indicates their network supports VoIP, or has meets another certification/compliance level.

At 416, the method may include communicating, to the access provider, an indication that the access request has been rejected. At 412, the method may include storing, in a memory, a mapping between a permanent user identity included in the response and the address of the user device. At 414, the method may include communicating, to the user device, an indication that the access request has been accepted.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for requesting, by an access provider on behalf of a potential guest user, access to a wireless network and receiving a response, including the particular steps of the method of FIG. 4, this disclosure contemplates any suitable method for requesting, by an access provider on behalf of a potential guest user, access to a wireless network and receiving a response, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In one example embodiment, a hotel that offers access to a wireless network to its registered guests may wish to obtain the telephone numbers of the guests of the hotel. Therefore, when a user device of a hotel guest locates an access point for the hotel's wireless network, in order for the hotel guest to be permitted to connect to the hotel's wireless network through their user device, the access point may require that the hotel guest has consented to provide their telephone number. In this example, if the hotel guest has consented to provide their telephone number, in general or to specific types of service providers, including hospitality providers, an identity provider associated with the hotel guest may provide the telephone number in the access accept response it returns to the access provider. In another example, a potential guest user may not have consented to provide their telephone number when and if it is required in order to access a wireless network operated by a retailer.

In certain embodiments, an access provider may exchange information with an identity provider regarding identity provider policies. This information may include, for example, an indication of whether the identity provider is required to receive accounting information from the access provider, or whether the identity provider specifically does not want to receive accounting information. In certain embodiments, there may be defined policies indicating which, if any, logging data related to operations performed, services received, or resource usage are to be signaled to the identity provider (which may be associated with the potential guest user's home service provider) for accounting purposes. For example, in an academic environment, this type of accounting information may not be required. However, a service provider may require that this type of accounting information be signaled to the identity provider.

FIG. 5 is a flow diagram illustrating an example method for authenticating, by an identity provider, a request to access a wireless network, including determining compliance with applicable identity and/or access policies. Method 500 may begin and, at 502, may include receiving, by an identity provider that has joined an identity and access federation from an access provider that has also joined the federation, an access request made on behalf of a user. The request may include at least one policy applicable to the request. For example, the request may have been augmented by the access provider to indicate any of a variety of identity provider policies and/or user-consented policies that are applicable to the request.

Method 500 may include, at 504, obtaining policy and consent data associated with the user, and comparing the accessed policy and consent data to any user-consented policy or policies specified in the received access request. In certain embodiments, the user-specific policy and consent data may be stored and maintained in a memory by the identity provider and may be retrieved on demand in response to an access request. The user-specific policy and consent data may include data indicating which of the defined access and/or identity policies defined by the federation have been consented to by the user under certain conditions. For example, consent to specific policies, such as a requirement to provide a telephone number or other permanent identity, may be indicted as a general (blanket) consent. In another example, consent to specific policies may be agreed to or withheld from specific types of enterprises or service providers (e.g., agreed to or withheld from hospitality providers, retailers, airports, or academic institutions), enterprises or service providers in specific geographic locations (e.g., agreed to only within the United States), or for specific types of venues (e.g., agreed to or withheld from concert or sporting event venues, amusement parks, or recreational areas).

If, at 506, the comparison indicates that the user previously consented to the required user-consented policy or policies, method 500 may proceed to 508. Otherwise, the method may proceed to 512. For example, not every potential guest user may consent to providing a telephone number or other permanent identity. Therefore, the negotiation may succeed or fail, at least in part, on a user or subscriber basis, as the user may opt in or opt out of particular access and/or identity policies. In addition, some identity providers may have more restrictive policies regarding the sharing of private user information with third parties than other identity providers, and this may hold true even for members of the federation.

If, at 508, it is determined that other applicable policies, if any, are met, method 500 may proceed to 510. Otherwise, method 500 may proceed to 512. For example, the request may identify any number of identity provider policies that are applicable to the request instead of, or in addition to, any number of user-consented policies that are applicable to the request.

At 510, the method may include communicating, to the access provider, an indication that the access request has been accepted. In certain embodiments, the response may include a permanent user identity. In certain embodiments, if all of the access and/or identity policy requirements are agreed to and met, the identity provider may complete the EAP dialogue. More specifically, the identity provider may construct an access accept message and may embed a permanent identity of the user (e.g., the user's telephone number, or MSISDN), or other information required by an applicable policy, in a particular attribute within the access accept message (e.g., a chargeable user ID attribute or other attribute).

At 512, the method may include communicating, to the access provider, an indication that the access request has been rejected. For example, in certain embodiments, if not all of the access and/or identity policy requirements are agreed to or met, the identity provider may construct an access reject message and may embed an indication of the failure within the access reject message (e.g., an indication of a policy failure.) In various embodiments, the failure of an AAA negotiation may be due to the fact that a particular identity provider does not support a required policy or may be due to the potential guest user having opted out of one or more required policies. In certain embodiments, the signaling of the failure indication may include a detailed description of the reason, from a policy perspective, that the negotiation failed. For example, the failure indication may include an indication of the required policy or policies to which the user failed to consent.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for authenticating, by an identity provider, a request to access a wireless network, including determining consent with respect to applicable identity and/or access policies, and including the particular steps of the method of FIG. 5, this disclosure contemplates any suitable method for authenticating, by an identity provider, a request to access a wireless network, including determining consent with respect to applicable identity and/or access policies, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
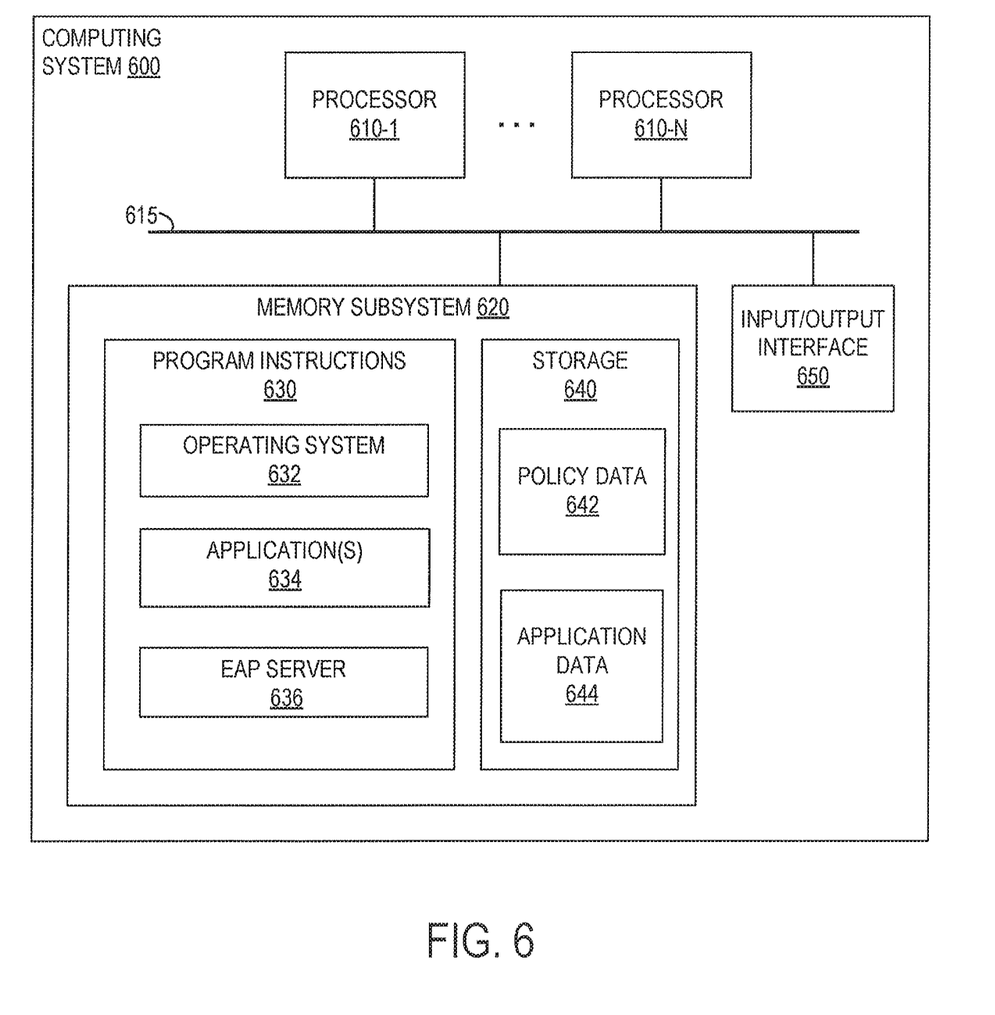
FIG. 6 is a block diagram illustrating selected elements of an example computing system.

FIG. 6 is a block diagram illustrating selected elements of an example computing system 600. In this example embodiment, computing system 600 includes one or more processors 610. Each of processors 610 may include circuitry or logic to interpret or execute program instructions and/or to process data. For example, each processor 610 may include a microprocessor, microcontroller, digital signal processor (DSP), graphics processor (GPU), or application specific integrated circuit (ASIC). In certain embodiments, one or more of processors 610 may be a multi-core and/or multi-threaded processor including circuitry to execute program instructions in parallel on behalf of operating system 632, one or more applications 634, EAP server 636, or any other software modules resident within program instructions 630. Processors 610 may interpret and/or execute program instructions and/or process data stored locally in memory subsystem 620 or remotely (not shown).

Processors 610 may implement any instruction set architecture, in different embodiments. In certain embodiments, all of the processors 610 may implement the same instruction set architecture. In other embodiments, two or more of processors 610 may implement different instruction set architectures. Processors 610 are coupled to a memory subsystem 620 and an input/output subsystem 650 via a system interface 615. System interface 615 may implement any of a variety of suitable bus architectures and protocols including, but not limited to, a Micro Channel Architecture (MCA) bus, Industry Standard Architecture (ISA) bus, Enhanced ISA (EISA) bus, Peripheral Component Interconnect (PCI) bus, PCI-Express (PCIe) bus, or a HyperTransport (HT) bus, in various embodiments.

In various embodiments, memory subsystem 620 may include random access memory (RAM), read-only memory (ROM), electrically erasable programmable read-only memory (EEPROM), flash memory, magnetic storage, opto-magnetic storage, and/or any other type of volatile or non-volatile memory. In certain embodiments, memory subsystem 620 may include non-transitory computer-readable mass-storage or removable media, e.g., a hard disk drive, floppy disk drive, Compact Disk (CD) or Digital Video Disk (DVD), and/or other type of rotating storage media, and/or another type of solid state storage media. In certain embodiments, memory subsystem 620 may include a database and/or network storage (for example, a server).

In the example embodiment illustrated in FIG. 6, memory subsystem 620 includes program instructions 630, including program instructions that when executed by one or more of the processors 610 implement some or all of the methods described herein for automatically on-boarding identity providers, access providers, and/or user devices in enterprise environments, as well as other methods. For example, program instructions 630 include operating system 632, one or more applications 634, and EAP server 636. Applications 634 may include program instructions to implement a federated identity and access services engine, an authentication engine of an identity provider, a request builder of an access provider, or any other software modules executable to implement the described methods.

In certain embodiments, EAP server 636 may be configured to construct messages to be exchanged between access providers, identity providers, enterprise entities, and/or service providers to perform AAA negotiations, as described herein. Other messages may be constructed and exchanged at the direction of, or on behalf of, federated identity and access services engine 634 to facilitate the onboarding of an access provider or identity provider to an identity and access federation within a wireless roaming environment. In certain embodiments, the messages constructed by EAP server 636 may include access policy and/or identity policy information, including indications of applicable policies and/or indications of whether applicable policies have been consented to or otherwise met. In certain embodiments, federated identity and access services engine 634 may be configured to perform any or all of the methods described herein for facilitating the automatic on-boarding of access providers and/or identity providers in enterprise environments.

In the example embodiment illustrated in FIG. 6, storage 640 within memory subsystem 620 may include storage for a policy repository (shown as 642) and storage for application data (shown as 644). Policy data 642 may include information about policies required by an access provider for particular users or networks, subscriber access policy and consent data (e.g., access policy and consent data for users with whom an identity provider has an existing relationship), or any other policy-related data usable by the applications 634. Application data 644 may store mappings between MAC addresses and permanent identities, subscriber identity data (e.g., one or more permanent identities for users with whom an identity provider has an existing relationship), or any other data accessed or produced by any of the applications 634 during operation.

In the example embodiment illustrated in FIG. 6, input/output interface 650 may implement any of a variety of digital and/or analog communication interfaces, graphics interfaces, video interfaces, user input interfaces, and/or peripheral interfaces for communicatively coupling input/output devices or other remote devices to the components of computing system 600. For example, certain embodiments, input/output interface 650 may implement any of a variety of suitable bus architectures and protocols including, but not limited to, an MCA bus, an ISA bus, an EISA bus, a PCI bus, a PCIe bus, or an HT bus. Input/output interface 650 may generate signals to be provided (e.g., via one or more output pins of computing system 600) to one or more display devices, a graphics accelerator card, and/or other input/output devices (such as a keyboard, a mouse, a camera, a microphone, a universal asynchronous receiver/transmitter (UART) device or device interface, a universal serial bus (USB) device or device interface, a Bluetooth wireless UART device or device interface or an I/O expansion interface device) (not shown in FIG. 6). In certain embodiments, input/output interface 650 may implement any suitable communication interface through which computing system 600 can exchange messages with one or more access providers, identity providers, enterprise entities, and/or service providers to perform AAA negotiations, as described herein. For example, input/output interface 650 may support communication over one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Modifications, additions, or omissions may be made to the systems and apparatuses disclosed herein without departing from the scope of the disclosure. The components of the systems and apparatuses may be integrated or separated. For example, the components of computing system 600 may be located on one or more boards within a single computing system housing or may be located on multiple boards distributed within respective computing system housings. Moreover, the operations of the systems and apparatuses may be performed by more, fewer, or other components. For example, the operations of a federated identity and access services engine 110 may be performed by one component, or may be performed by more than one component. Similarly, the operations of any of applications 634 and/or EAP servers 636 may be performed by respective single components, or may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In certain embodiments, the operations of the embodiments may be performed by one or more non-transitory computer readable media encoded with a computer program, software, computer executable instructions, and/or instructions capable of being executed by a computer. In certain embodiments, the operations of the embodiments may be performed by one or more non-transitory computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include, without limitation, computer memory (for example, RAM or ROM), mass storage media (for example, a hard disk), removable storage media (for example, a CD or a DVD), database and/or network storage (for example, a server), and/or other computer-readable medium.

Components of the systems and apparatuses disclosed herein may be coupled by any suitable communication network. A communication network may comprise all or a portion of one or more of the following: a PSTN, a public or private data network, a LAN, a MAN, a WAN, a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network component, comprising:
one or more processors; and
one or more computer-readable non-transitory storage media coupled to the one or more processors and comprising instructions that, when executed by the one or more processors, cause the network component to perform operations comprising:

receiving, by an identity provider, a request to access a wireless network from an access provider, wherein:
the identity provider and the access provider are members of an identity and access federation implemented in a wireless roaming environment; and
the request to access the wireless network is made on behalf of a user;
obtaining, by the identity provider, data associated with the user;
comparing, by the identity provider, the data associated with the user to a user-consented policy; and
determining, by the identity provider, whether the user previously consented to the user-consented policy.

2. The network component of claim 1, the operations further comprising:
determining that the user previously consented to the user-consented policy; and
indicating, in an access request response, an acceptance to the request to access the wireless network.

3. The network component of claim 1, the operations further comprising:
determining that the user failed to previously consent to the user-consented policy; and
indicating, in an access request response, a rejection to the request to access the wireless network.

4. The network component of claim 1, the operations further comprising:
storing the data associated with the user, wherein the data comprises user-specific policy and consent data; and
retrieving the data associated with the user on demand in response to receiving the request to access the wireless network.

5. The network component of claim 1, the operations further comprising determining compliance with an identity provider policy.

6. The network component of claim 1, wherein the identity provider is associated with one of the following:
an Internet service provider;
a cellular data service provider;
an authentication service; and
a social media service.

7. The network component of claim 1, wherein the identity and access federation defines at least common terms, conditions, and terms of service for access policies and identity policies.

8. A method, comprising:
receiving, by an identity provider, a request to access a wireless network from an access provider, wherein:
the identity provider and the access provider are members of an identity and access federation implemented in a wireless roaming environment; and
the request to access the wireless network is made on behalf of a user;
obtaining, by the identity provider, data associated with the user;
comparing, by the identity provider, the data associated with the user to a user-consented policy; and
determining, by the identity provider, whether the user previously consented to the user-consented policy.

9. The method of claim 8, further comprising:
determining that the user previously consented to the user-consented policy; and
indicating, in an access request response, an acceptance to the request to access the wireless network.

10. The method of claim 8, further comprising:
determining that the user failed to previously consent to the user-consented policy; and
indicating, in an access request response, a rejection to the request to access the wireless network.

11. The method of claim 8, further comprising:
storing the data associated with the user, wherein the data comprises user-specific policy and consent data; and
retrieving the data associated with the user on demand in response to receiving the request to access the wireless network.

12. The method of claim 8, further comprising determining compliance with an identity provider policy.

13. The method of claim 8, wherein the identity provider is associated with one of the following:
an Internet service provider;
a cellular data service provider;
an authentication service; and
a social media service.

14. The method of claim 8, wherein the identity and access federation defines at least common terms, conditions, and terms of service for access policies and identity policies.

15. One or more computer-readable non-transitory storage media embodying instructions that, when executed by a processor, cause the processor to perform operations comprising:
receiving, by an identity provider, a request to access a wireless network from an access provider, wherein:
the identity provider and the access provider are members of an identity and access federation implemented in a wireless roaming environment; and
the request to access the wireless network is made on behalf of a user;
obtaining, by the identity provider, data associated with the user;
comparing, by the identity provider, the data associated with the user to a user-consented policy; and
determining, by the identity provider, whether the user previously consented to the user-consented policy.

16. The one or more computer-readable non-transitory storage media of claim 15, the operations further comprising:
determining that the user previously consented to the user-consented policy; and
indicating, in an access request response, an acceptance to the request to access the wireless network.

17. The one or more computer-readable non-transitory storage media of claim 15, the operations further comprising:
determining that the user failed to previously consent to the user-consented policy; and
indicating, in an access request response, a rejection to the request to access the wireless network.

18. The one or more computer-readable non-transitory storage media of claim 15, the operations further comprising:
storing the data associated with the user, wherein the data comprises user-specific policy and consent data; and
retrieving the data associated with the user on demand in response to receiving the request to access the wireless network.

19. The one or more computer-readable non-transitory storage media of claim 15, the operations further comprising determining compliance with an identity provider policy.

20. The one or more computer-readable non-transitory storage media of claim 15, wherein the identity provider is associated with one of the following:

an Internet service provider;
a cellular data service provider;
an authentication service; and
a social media service.

* * * * *